Sept. 1, 1931.  E. J. HIRVONEN ET AL  1,821,156

BRAKE

Original Filed April 26, 1923

INVENTORS
Erik J. Hirvonen
Wallace W. Tuttle by
Henry A. Tuttle, admr.
BY
ATTORNEY Patented Sept. 1, 1931

1,821,156

UNITED STATES PATENT OFFICE

ERIK J. HIRVONEN, OF PONTIAC, MICHIGAN, AND WALLACE W. TUTTLE, DECEASED, LATE OF PUTNAM, CONNECTICUT, BY HENRY A. TUTTLE, ADMINISTRATOR, OF UPTON, MASSACHUSETTS, ASSIGNORS, BY MESNE ASSIGNMENTS, TO BENDIX BRAKE COMPANY, OF SOUTH BEND, INDIANA, A CORPORATION OF ILLINOIS

BRAKE

Original application filed April 26, 1923, Serial No. 634,855. Divided and this application filed September 29, 1927. Serial No. 222,899.

This invention relates to brakes and is illustrated as embodied in an internal expanding brake for the front wheel of an automobile. An object of the invention is to provide a mounting for the anchors or pivots of the adjacent ends of a pair of brake shoes, the illustrated form being especially advantageous where the ends of the shoes overlap each other, and which is arranged to connect the two anchors to brace them against the torque of the brake. Preferably the reinforcing member is arranged to transmit the torque of the brake directly to the front wheel knuckle, for example by thrusting against an adjustable extensible member such as a threaded stud. The above and other objects and features of the invention, including various novel and desirable structural details, will be apparent from the following description of one illustrative embodiment shown in the accompanying drawings, in which:

Figures 1, 2, 3, 4:
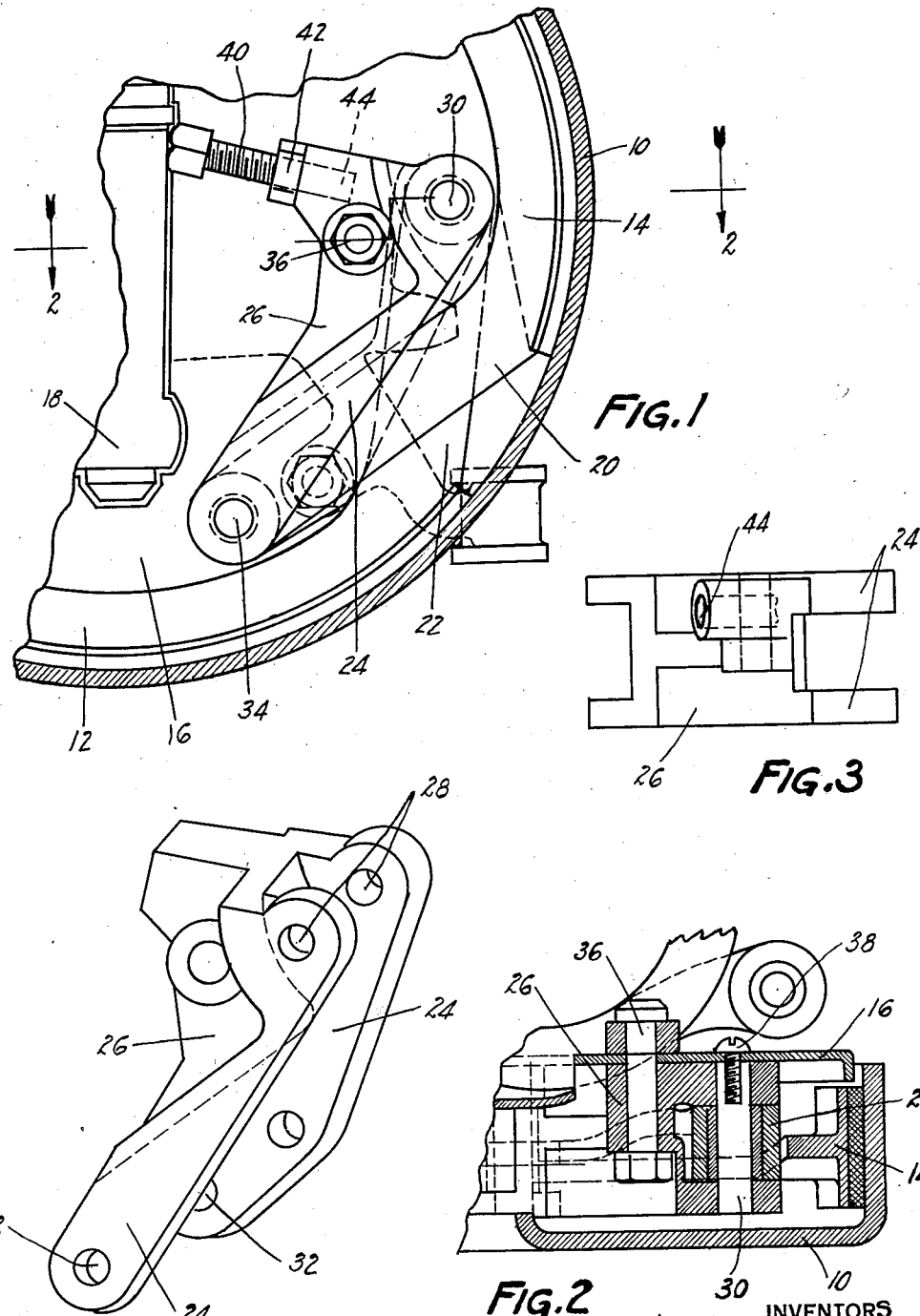
Figure 1 is a partial vertical section through the brake just inside the head of the brake drum and showing the brake shoes in side elevation.
Fig. 2 is a partial section through the brake, on the line 2—2 of Figure 1.
Fig. 3 is a top plan view of the reinforcing member which connects the two anchors.
Fig. 4 is a perspective view of the reinforcing member.

In the illustrated arrangement the brake includes a rotatable brake drum 10, within which are arranged the brake shoes 12 and 14 of the brake and at the open side of which is a backing plate or dust cover 16 carried by the front wheel knuckle 18. The shoes 12 and 14 preferably project beyond each other and overlap at their anchored ends, the shoe 14 being forked to provide a pair of anchor arms 20 and the shoe 12 having a single anchor arm 22 projecting between the arms 20 of the shoe 14.

The present invention relates to the mounting of the anchors for the shoes 12 and 14 or their equivalents, preferably so that the torque of the brake is transmitted directly to the front wheel knuckle 18 in such a manner as to relieve the relatively light backing plate 16 from part or all of the load caused by the torque when the brake is applied.

In the particular arrangement illustrated the arms 20 and 22 of the two shoes project between side flanges 24 of a novel reinforcing member 26. The side flanges are provided with openings 28 for a pivot 30 serving as the anchor for arm 22 of the shoe 12, and with openings 32 for a pivot 34 serving as the anchor for the arms 20 of the shoe 14. The reinforcing member 26 is or may be secured to the backing plate 16 by means such as a bolt 36, and, if desired, the pivots 30 and 34 may be fastened to the backing plate 16 by means such as screws 38, one of whose functions is to prevent axial movements of the pivots 30 and 34.

If the backing plate 16 is made sufficiently heavy and is firmly secured to the knuckle 18 or its equivalent, the above-described mounting will provide entirely rigid anchorage for the brake, the member 26 serving to reinforce the backing plate 16 so that even a relatively light pressed metal backing plate can be used. If a still lighter backing plate 16 is to be used, the torque may be transmitted from the reinforcing member 26 directly to the knuckle 18 by a suitable thrust member which may, if desired, take the form of an adjustable stud 40 engaging the knuckle at its end and having threaded thereon a nut 42 engaging the surface of the reinforcing member 26 immediately around a socket 44 into which the end of the stud 40 projects. This is especially desirable when the brake is mounted on an automobile which was not originally fitted with front wheel brakes, since the nut 42 may be adjusted to brace the anchors 30 and 34 rigidly from the knuckle 18 so that all of the strain caused by the torque of the brake is transmitted directly to the knuckle.

The present application is a division of application Serial No. 634,855, filed April 26, 1923, by Erik J. Hirvonen and Wallace W. Tuttle, on which application Patent No. 1,649,975, issued November 1, 1927.

While one illustrative embodiment of the invention has been described in detail, it is not the intention to limit its scope to that particular embodiment or otherwise than by the terms of the appended claims.

We claim:

1. A brake comprising shoes overlapping at their anchored ends, in combination with a separate reinforcing member to which said shoes are separately pivotally anchored.

2. A brake comprising, in combination, a drum, a backing plate at the open side of the drum, shoes within the drum overlapping at their anchored ends, and a reinforcing member separate from the backing plate and connecting the anchored ends of the shoes.

3. A brake comprising, in combination with a front wheel knuckle, a pair of shoes having their anchored ends projecting past each other and overlapping, and a reinforcing member to which both of said ends are pivoted and which transmits the torque from said ends directly to the knuckle.

4. A brake comprising, in combination with a front wheel knuckle, a pair of shoes having adjacent overlapping anchored ends, and a reinforcing member to which both of said ends are pivoted and which transmits the torque from said ends directly to the knuckle.

5. A brake comprising, in combination with a front wheel knuckle, a pair of shoes having their anchored ends projecting past each other and overlapping, a reinforcing member to which both of said ends are connected, and a thrust member through which said reinforcing member transmits the torque of the shoes to the knuckle.

6. A brake comprising, in combination with a front wheel knuckle, a pair of shoes having adjacent anchored ends, a reinforcing member to which both of said ends are connected, and a thrust member through which said reinforcing member transmits the torque of the shoes to the knuckle.

7. A brake comprising, in combination with a front wheel knuckle, a pair of shoes having their anchored ends projecting past each other and overlapping, a reinforcing member to which both of said ends are connected, and an adjustable extensible member through which said reinforcing member transmits the torque of the shoes to the knuckle.

8. A brake comprising, in combination with a front wheel knuckle, a pair of shoes having adjacent anchored ends, a reinforcing member to which both of said ends are connected, and an adjustable extensible member through which said reinforcing member transmits the torque of the shoes to the knuckle.

9. A brake anchor reinforcing member having side flanges, a pair of shoes having their ends arranged in overlapping relationship between the flanges, pivots for said ends carried by the flanges, and means for mounting said member on a support.

10. A brake including, in combination with a wheel knuckle, a brake drum, a brake carrier supported by said knuckle, a brake shoe within said drum anchored to said carrier, and adjustable means connecting said carrier and knuckle.

11. A brake including, in combination with a wheel knuckle, a brake drum, a brake carrier supported by said knuckle, a brake shoe within said drum anchored to said carrier, and an adjustable member carried by said carrier and bearing upon said knuckle.

12. A brake including, in combination with a wheel knuckle, a brake drum, a brake carrier supported by said knuckle, a brake shoe within said drum anchored to said carrier, and an adjustable member having a screw-threaded connection with said carrier and a bearing on said knuckle.

13. A brake including, in combination with a wheel knuckle, a brake drum, a brake carrier supported by said knuckle, a brake shoe within said drum anchored to said carrier, a bracket secured to said carrier, and adjustable means connecting said carrier and knuckle.

14. A brake including, in combination with a wheel knuckle, a brake drum, a brake carrier supported by said knuckle, a brake shoe within said drum anchored to said carrier, a bracket secured to said carrier, and an adjustable member having a screw-threaded connection with said bracket and a pressure-bearing on said knuckle.

15. A brake including, in combination with a wheel knuckle, a brake drum, a brake carrier supported by said knuckle, a brake shoe within said drum anchored to said carrier, and adjustable means connecting said carrier and knuckle constituting means to transmit braking torque from said brake shoe to said knuckle.

16. A brake including, in combination with a wheel knuckle, a brake drum, a brake carrier supported by said knuckle, a brake shoe within said drum anchored to said carrier, and an adjustable member connecting said carrier and knuckle and extended generally parallel with said carrier.

17. A brake including, in combination with a wheel knuckle, a brake drum, a brake carrier supported by said knuckle, a brake shoe within said drum anchored to said carrier, a bracket secured to said carrier, and a screw having a screw-threaded connection with said bracket and a head which bears against said knuckle.

18. A brake including, in combination with a wheel knuckle, a brake drum, a brake carrier supported by said knuckle, a brake shoe within said drum, an anchoring bracket secured to said carrier to which said shoe is anchored, and an adjustable extensible member which transmits the breaking torque of said shoe to said knuckle.

19. A brake including, in combination with a wheel knuckle, a brake drum, a brake carrier supported by said knuckle, a brake shoe within said drum, an anchoring bracket secured to said carrier to which said shoe is anchored, and an adjustable extensible member connecting said bracket and knuckle and transmitting braking torque of said shoe therebetween.

20. A brake including, in combination with a wheel knuckle, a brake drum, a brake carrier supported by said knuckle, a brake shoe within said drum, an anchoring bracket secured to said carrier to which said shoe is anchored, and an adjustable member bearing on said bracket and knuckle and transmitting braking torque therebetween.

In testimony whereof, we have hereunto signed our names.

ERIK J. HIRVONEN.
HENRY A. TUTTLE,
*Administrator of the Estate of Wallace W. Tuttle, Deceased.*